May 10, 1927.

H. A. LOMASON

BOLT

Filed Sept. 13, 1924

1,627,912

Inventor
Harry A. Lomason,

By

Attorneys

Patented May 10, 1927.

1,627,912

UNITED STATES PATENT OFFICE.

HARRY A. LOMASON, OF DETROIT, MICHIGAN.

BOLT.

Application filed September 13, 1924. Serial No. 737,450.

Running boards for motor vehicles as commonly constructed, comprise a board of wood provided with a fabricated covering material and also provided with bolts for attaching the board to brackets upon the chassis of the car. In order that the heads of the bolts may be concealed and a flat even surface provided for the covering material, the bolts are set into openings in the board, but it is the usual practice to manufacture these boards complete with the bolts in place and the covering material fastened to the board, so that the finished board may be applied to the motor vehicle in the assemblage of the vehicle. Should the securing bolts not be properly anchored within the board, or should the workmen attempt to force the bolts through the openings in the brackets by pressure upon the boards, the bolts are very liable to be forced out of the openings in the board and through the covering material, thus destroying the finished running board.

It is also necessary that the bolts be so secured within the board that a nut may be turned up upon the projecting screwthreaded end of each bolt to secure the running board in place, without danger of the bolt turning in the board. As usually constructed these bolts are provided with a squared shank portion and are driven into round holes in the board, these holes having countersink upper ends to receive the heads of the bolts, and the bolts are thus prevented from turning in the wooden board by the forcing of the squared shanks of the bolts into the round holes in the board. Unless care is exercised by the workmen in placing these bolts in the board prior to securing the covering material thereon, the bolts are loose in the board and when the board is to be attached to the vehicle brackets, the nuts cannot be properly turned up on account of the bolts turning freely in the board, and further, if the bolts are loose they are very liable to be driven out of the openings in the board and through the covering material, causing an irreparable injury and loss.

An object of the present invention is to provide a bolt for the purpose which may be very expeditiously anchored within openings in the wooden board in such a manner as to obviate the bolts from becoming loose or from being driven out through the upper side of the board and thus destroying the covering material thereon. A further object is to provide a bolt which may be quickly and easily anchored within an opening in the wooden board to securely hold the bolt against turning, and the construction of which bolt is such as to facilitate its application to the board and insure its proper anchorage therein, the setting or driving of the bolt into the opening in the board, at the same time securely anchoring the bolt in place against possibility of its becoming loose or being accidentally driven out and injuring the covering material. It is also an object of the present invention to provide a new method of anchoring bolts within openings in a running board whereby, by the use of a suitable setting tool, the bolts are driven to place within the openings in the board and at the same time securely anchored therein, thus facilitating the setting of the bolts and obviating the danger of improper anchorage due to carelessness on the part of the workmen. A further object of the present invention is to secure certain other advantages due to the construction and method of application, all as hereinafter more fully set forth.

With the above and other ends in view, the invention consists in the matters hereinafter set forth and more particularly pointed out in the appended claims, reference being had to the accompanying drawing, in which—

Figure 1:
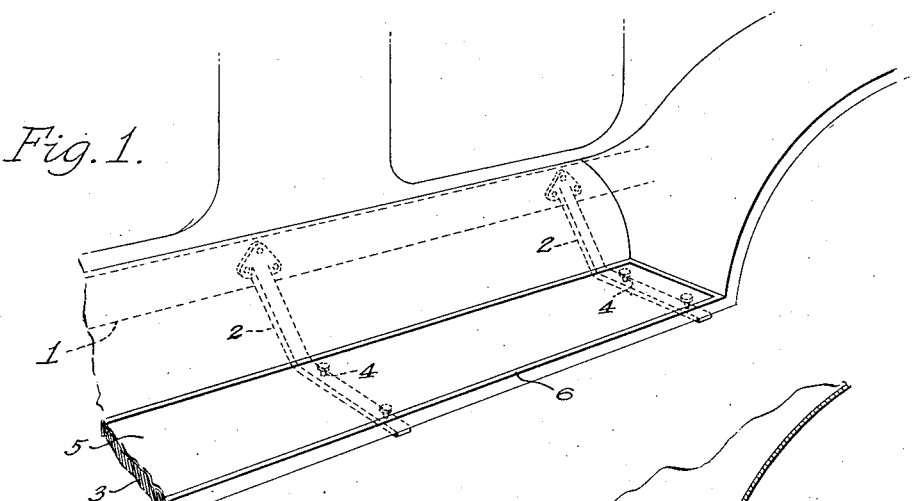
Figure 1 is a perspective view of a running board embodying the present invention and shown in place upon the brackets for supporting the same carried by the chassis of a motor vehicle.
Figure 2:
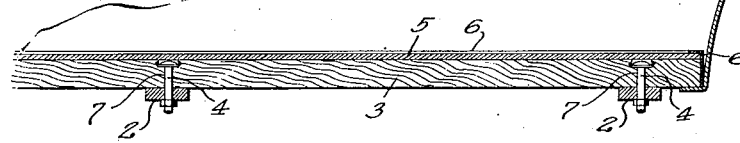
Fig. 2 is a longitudinal section through a portion of the running board showing securing bolts in place therein.
Figure 3:
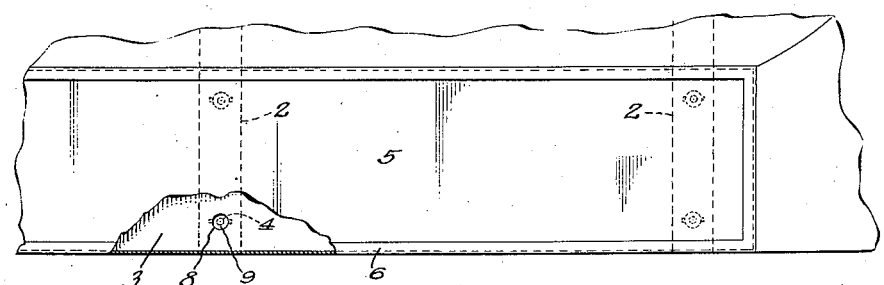
Fig. 3 is a plan view of the same with covering material broken away to show the bolt heads and the manner in which the bolts are anchored within the openings in the board.
Figure 4:
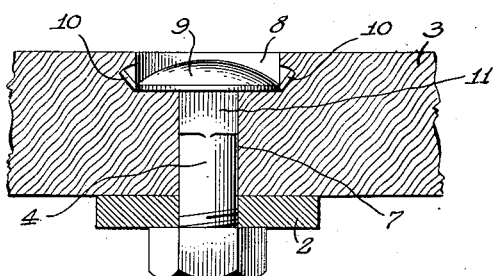
Fig. 4 is an enlarged sectional detail showing the manner in which a bolt is anchored in the board.
Figure 5:
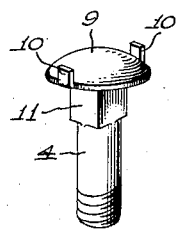
Fig. 5 is a perspective view of a bolt detached.

As shown in the accompanying drawing, 1 indicates a chassis frame member of a motor vehicle to which running board brackets 2 are secured in the usual manner. 3 indicates a wooden board which forms the body of the running board and is provided with openings to receive bolts 4 for securing the running board to the brackets. 5 indicates a covering of suitable fabricated material which is secured in place upon the upper side of the board 3 by a suitable metal binding 6 applied to the board and holding the covering material in the usual manner.

Each hole 7 in the board 3 to receive the bolt 4, is enlarged at its upper end to provide a recess or countersink 8 to receive the substantially round and comparatively flat head 9 of the bolt, which head is preferably given the form of the head of a carriage bolt, being crowned at its upper side. Formed integral with the peripheral edge of the head 9 of each bolt, is one or more upwardly extending lugs 10, these lugs being preferably two in number and arranged diametrically at opposite points of the circumference of the head. Each bolt may also be formed with a shank portion 11 which is rectangular in cross section, which is the usual practice in making carriage bolts, so that the bolt may be driven into a round opening, and the shank portion engaging the opening will prevent the bolt from turning therein.

To facilitate the anchoring of each bolt within its openings in the board, a suitable setting tool (not shown) may be employed, and said tool may be formed toward its lower end to engage between the lugs on the head of the bolt and spread or bend these lugs outwardly as the bolt is driven to place within the openings in the board, the end of the tool engaging the head of the bolt to drive the bolt to place. By the use of such a tool the bolt may be driven to place, and as the head of the bolt comes to its seat on the bottom of the countersink, the lugs will be bent outwardly and driven laterally into the surrounding wood of the countersink to firmly anchor the bolt within the board. When so anchored, these lugs projecting laterally from the head, prevent the bolt from again being driven out through the upper side of the board and at the same time securely hold the bolt against rotation within the board. The use of the squared shank portion is therefore a mere added precaution against the turning of the bolt, and may be dispensed with.

When properly set, with the lugs bent laterally into firm engagement with the wall of the wood surrounding the countersink, the possibility of the bolt becoming loose is precluded, and by employing a proper tool for setting the bolt, proper setting is insured, so that should force be used to drive the bolts through the openings in the brackets in securing the running board in place upon the vehicle, said bolts will not be driven out of the board and up through the covering material, thus destroying the board. Further the anchoring lugs preclude the possibility of the bolts turning within the board when nuts are applied to the lower ends of the bolts for firmly securing the board to its supporting brackets.

Obviously, the particular form of bolt illustrated, may be modified within the scope of the appended claims and the number and arrangement of bendable lugs may be changed to suit the conditions of installation or to meet the desires of the manufacturer.

Having thus fully described my invention, what I claim is:—

1. As an article of manufacture, a bolt having a shank portion to be passed through an opening in a member to be secured by said bolt and a head portion on the shank to fit within a countersink in said member, said head being formed with an upstanding part projecting substantially parallel with the longitudinal axis of the bolt to enter the countersink when the head is inserted therein and to be bent laterally into engagement with the side wall of the countersink and prevent longitudinal movement of the bolt in said opening.

2. A bolt for the purpose described including a head and upstanding lugs integral with the head to provide for entering said head and lugs within a countersink around an opening to receive the bolt, said lugs being bendable into engagement with the side wall of the countersink to hold the bolt against endwise movement.

3. A bolt for the purpose described including a shank and a circular head with a portion of the shank adjacent the head formed angular in cross section, said bolt shank and angular portion being adapted to be inserted in an opening in a member and said head being adapted to fit within a countersink in the member around said opening, and members formed integral with the periphery of the head and extending in a direction substantially longitudinal of the bolt to enter the countersink when the head is entered therein and to be bent laterally of the head and forced thereby into the side wall of the countersink to hold the bolt in its opening with its head firmly seated upon the bottom of the countersink.

In testimony whereof I affix my signature.

HARRY A. LOMASON.